United States Patent [19]
Pezzano

[11] Patent Number: 5,995,698
[45] Date of Patent: Nov. 30, 1999

[54] PHOTONIC TELEVISION SYSTEM WITH WAVEGUIDE CONTAINING ALTERNATING CONCAVE AND CONVEX LENSES

[76] Inventor: Joseph B. Pezzano, 1594 Unionport Rd., Apt. 1H, Bronx, N.Y. 10462

[21] Appl. No.: 08/959,193

[22] Filed: Oct. 28, 1997

Related U.S. Application Data

[63] Continuation-in-part of application No. 08/666,611, Jun. 18, 1996, abandoned.

[51] Int. Cl.$^6$ ..................................................... G02B 6/00
[52] U.S. Cl. ......................... 385/133; 359/366; 359/435; 359/894; 385/147
[58] Field of Search ................................. 385/15, 33–35, 385/116, 117, 119, 133, 147, 902; 359/362–366, 503–506, 894, 895, 435

[56] References Cited

U.S. PATENT DOCUMENTS

| | | | |
|---|---|---|---|
| 1,915,811 | 6/1933 | Wolf | 385/902 X |
| 2,453,862 | 11/1948 | Salisbury | 385/902 X |
| 2,651,715 | 9/1953 | Hines | 359/435 X |
| 3,382,022 | 5/1968 | Fox | 359/435 |
| 3,410,623 | 11/1968 | Kogelnik | 385/33 |
| 3,632,184 | 1/1972 | King | 359/365 |
| 3,653,738 | 4/1972 | Gloge | 385/133 |
| 4,087,159 | 5/1978 | Ulrich | 385/129 |
| 4,148,551 | 4/1979 | MacAnally | 359/435 |
| 4,439,022 | 3/1984 | Gebhardt et al. | 359/363 |
| 5,309,541 | 5/1994 | Flint | 385/133 |
| 5,463,712 | 10/1995 | Cawood | 385/117 |
| 5,469,519 | 11/1995 | Chang et al. | 385/33 |

*Primary Examiner*—John D. Lee
*Attorney, Agent, or Firm*—Morgan, Finnegan, LLP

[57] ABSTRACT

A photonic television system for propagating an image of light, in the form of its original three dimensional photonic makeup, through an airless, light proof, wave guide structure, utilizing a unique system of plastic concave and convex lenses in tandem, whose physical spacing is preferably one focal length from each other, which results in the photons of the image to be continually expanding and contracting, as they automatically propagate through each lens to the end of the wave guide, where via conventional magnifying lenses, the three dimensional image can be seen by a viewer, in a manner similar when viewing a microscope or telescope.

10 Claims, 2 Drawing Sheets

PHOTONIC TELEVISION SYSTEM WITH WAVEGUIDE CONTAINING ALTERNATING CONCAVE AND CONVEX LENSES

This application is a C-I-P of applicaiton Ser. No. 08/666,611, filed Jun. 18, 1996, and now abandoned.

FIELD OF THE INVENTION

This invention relates to a photonic television system.

BACKGROUND OF THE INVENTION

The photonic television system is a completely new method and apparatus of transmitting images over a distance, as compared to the conventional electronic television system currently in worldwide use. By its very nature of using photons, instead of electrons, the photonic television system has no electronic circuits and over short distances utilizes no power at all.

The photonic television system transmits images over a short distance such as a closed circuit television system of monitoring various rooms of a house or office building. In order for this system to transmit images over a greater distance, a photonic image amplifier should be installed at various points along the route.

The conventional electronic system breaks the light images up into electrical signals which are then transmitted through a median such as a coaxial cable and or electromagnetic waves to the distant receiver which then converts the electric signals back to a visual image. The photonic television system does not break-up or convert the visual image, but instead transmits the image in its actual original form which is simply comprised of myriads of photons each at various levels or states (energy levels) (colors).

The design of the photonic television system is considerably simpler in relation to the conventional electronic television system. The photonic television system transmits the visual image by a medium called a photonic wave guide. The photonic television system comprises a unique system of lenses, all internally incorporated within a physical structure consisting of a photonic wave guide which is joined at both ends by a photonic camera and a photonic projector.

Conventional wave guides taught by, e.g., Kogelnik U.S. Pat. No. 3,410,623 and Gloge U.S. Pat. No. 3,653,738 are different from the wave guide system of the invention as follows:

(1) existing optical wave guides use coherent light (laser photons), as opposed to the incoherent light (conventional or natural photons of light comprised of myriads of frequencies) that the photonic wave guide uses;

(2) existing optical wave guides transmit beams of light in which each beam conveys one bit of information; at any one instant of time, as opposed to the photonic wave guide which transmits images of light, in which each image conveys myriads of information (many colors or frequencies) at any one instant of time; and (3) existing optical wave guides have been designed to utilize the properties of coherent light to cause a desired function to occur, as opposed to the photonic wave guide which uses the properties of incoherent light to cause a desired function to occur.

OBJECTS AND ADVANTAGES OF THE INVENTION

The prime advantage that the photonic television system has over the conventional electronic television system is that at a short distance, a clearer image in its original photonic state can be transmitted to another location and viewed in its original natural three dimensional state.

In addition, the photonic television system uses no external power over short distances, such as monitoring the rooms of a house and other short distance closed circuit functions. Its reliability is vastly superior due to no electronic circuitry at all.

The foregoing specific objects and advantages of this invention are illustrative of those which can be achieved by the present invention and are not intended to be exhaustive or limiting of the possible advantages of this invention which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

The photonic television system is a unique method and apparatus of propagating an image of light projected by a camera, in the form of its original three dimensional photonic makeup, through an air and light proof wave guide structure to a projector where via conventional magnifying lenses the three dimensional image can be seen by a viewer. The three dimensional image is transmitted through the wave guide structure by a unique system of plastic concave and convex lenses functioning in tandem, whose physical spacing is preferably one focal length apart, so that the photons of the transmitted image are continually expanded and contracted as they propagate themselves through each lens to the end of the wave guide.

It will be appreciated by those skilled in the art that the following brief description and detailed description are exemplary and explanatory of this invention, but are not intended to be restrictive thereof or limiting of the advantages which can be achieved by this invention. Thus, the accompanying drawing, referred to herein and constituting a part hereof, illustrates a preferred embodiment of this invention and, together with the detailed description, serves to explain the principles of this invention.

BRIEF DESCRIPTION OF THE DRAWINGS

The above and other objects, features and advantages of this invention will be apparent from the following detailed description, especially when taken in conjunction with the accompanying drawing, wherein.

DETAILED DESCRIPTION

Figure 1:
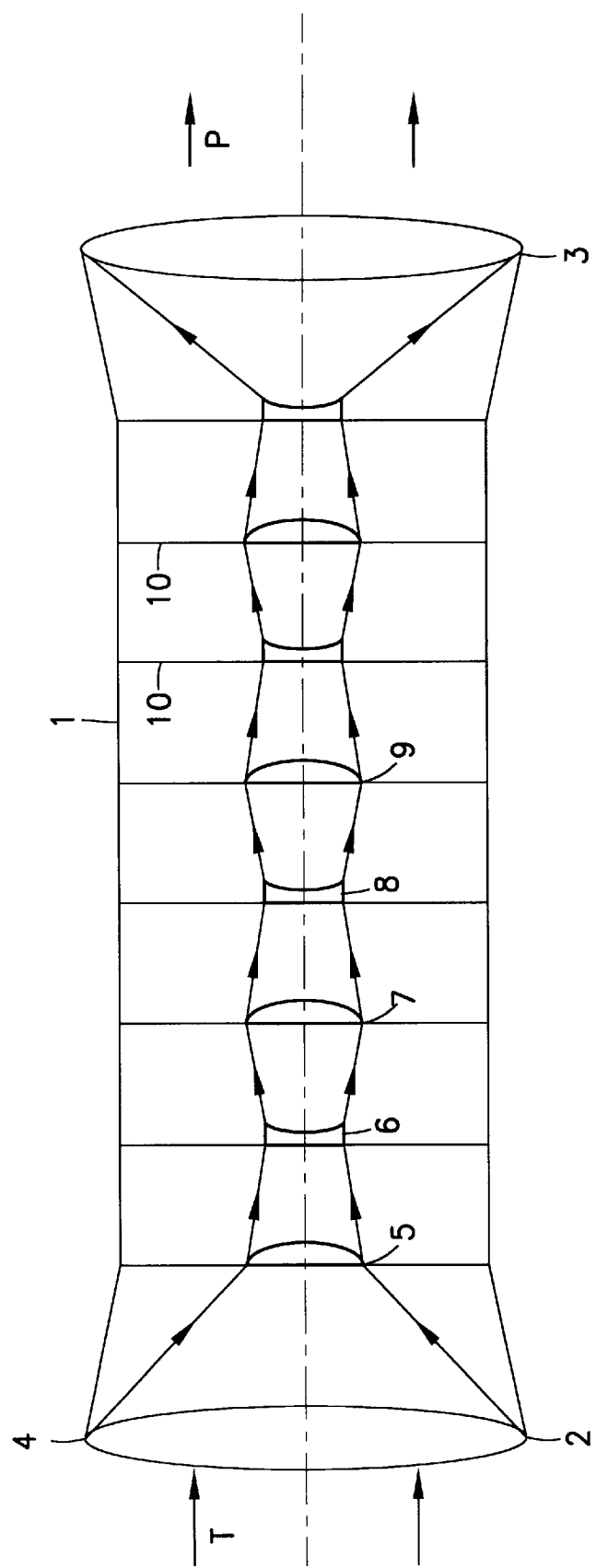
FIG. 1 shows a cross-sectional diagram of the photonic television system.

FIG. 1 shows a cross-sectional view of the photonic television system in accordance with the present invention. A photonic wave guide 1 is shown with a photonic camera 2 located at one end and a projector 3 located at the opposite end of said wave guide. The photonic camera projects an image presented to it at a transmitting site designated by the letter "T" in FIG. 1 onto its outer lens 4. The outer lens 4 then focuses and projects the image to its rear end lens 5 where it is reduced before it is focused and projected through the wave guide. The outer lens of the photonic camera should be of a large size dimension in relation to its rear end lens portion in order to allow as many photons as possible to enter into it before the image goes through the reduction process.

The image is then transmitted through a series of concave and convex lenses located within the photonic wave guide. The series of concave and convex lenses designated 6, 7, 8 and 9 in the photonic wave guide convey or transmit the image to its distant end where the photonic projector 3 re-magnifies or enlarges the image to a size where it can be perceived by a viewer. The number, shape and size of the concave and convex lenses is dependent upon the type and size of image that a viewer desires and is a function of the size of the photonic wave guide.

The photonic wave guide transmits the image through concave lens 6 so that it re-expands in its photon make-up. The re-expanded image is then transmitted through convex lens 7, which contracts the photons to a reduced image state. The reduced image is then focused on concave lens 8, where that concave lens will once again cause the photons to re-expand. The re-expanded image is then transmitted through convex lens 9 where it is again contracted to a reduced image state. The method of transmitting an image by expanding and contracting is repeated over and over again until the image is transmitted to the photonic projector for perception by a viewer. In other words, the image, which is simply made up of myriads of photons of different energy levels (colors) will simply be propelled along the photonic wave guide by properly spaced concave and convex lenses expanding and contracting it in a continuous cycle.

It should also be noted that, at each physical location in the photonic wave guide where there is a concave and a convex lens, in actuality, there are really two lenses joined together in series with each other in order to divert the photons of the image to the opposite mode of transmission (expanding or contracting) by first changing them into a tiny distance parallel mode. The lenses are separated and supported by the physical supports and spacers 10 shown in FIG. 1.

The photonic wave guide can be made from any strong but light material in which light and also air will not enter into it from its outside environment. The wave guide must be as light proof and airless (vacuum) as possible in its internal structure. Its internal walls are to be coated with a non-reflective surface so as not to reflect any stray photons of the traveling image producing glare and distortion at the receiving end designated "R" in FIG. 1.

The internal vacuum of the photonic wave guide causes the photons of light of the image to travel as unobstructed as possible. Air molecules introduced into the system would present an obstruction to the travelling photons whereby they would cause unwanted absorption, diffractions, and reflections, thus reducing the amount of photons which will reach the receiving end causing distortion of the image itself.

The inner walls of the photonic camera and the photonic projector connected to the photonic wave guide should also consist of a vacuum and be coated with a non-reflective surface. In short, the entire internal system should be as airless as possible with an internal absence of light so that the only light to enter into it will be the image presented to it from the photonic camera and transmitted to the photonic projector at the receiving site R.

When the image finally arrives at the distant end of the photonic wave guide, the photonic projector 3 will then, through its conventional enlarging lens systems, re-enlarge the image to the level where it can be perceived by the viewer.

In FIG. 1, the photonic wave guide is shown as a straight line structure, connecting both the transmitting site T and the receiving site R. This was done for purposes of illustrating this concept for ease of understanding. In actuality, however, the photonic wave guide is not always perfectly straight for practical hookups. Therefore, alternative embodiments of the photonic wave guide can be constructed where the system is bent along its axis at various angles, including at a 90 degree angle, much similar to the standard 90 degree elbow plumbing fixture used in all plumbing line systems, to achieve the desired projection of an image. This photonic elbow is a separate entity which can easily be attached to the straight line portion of the photonic wave guide system. Thus, the actual hookup of any photonic wave guide system can be laid down or run in any manner desired in the same way that a plumber routes his piping system from beginning to end. The photonic elbow can re-route the image to the left, right, up or down.

Figure 2:
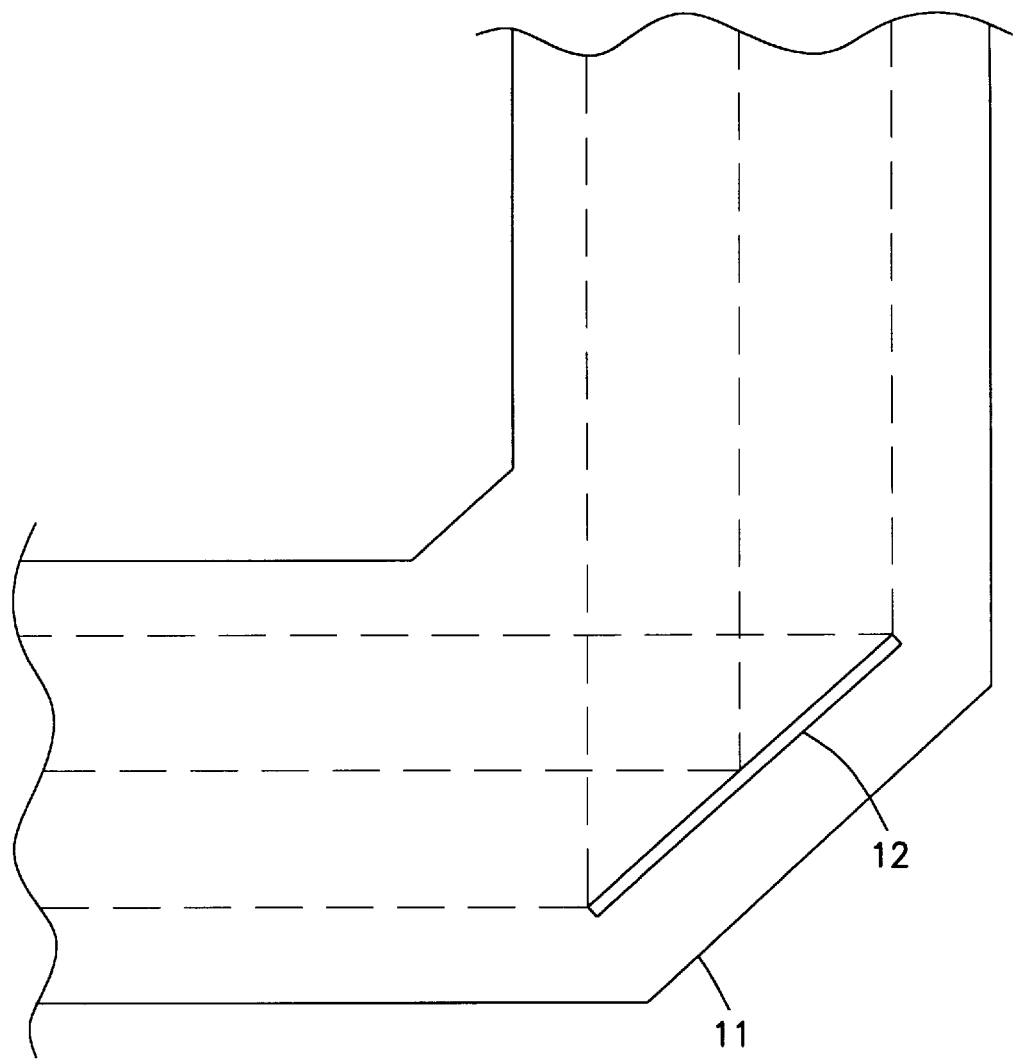
FIG. 2 shows a cross-sectional diagram of the photonic elbow of the photonic television system.

In an exemplary embodiment shown in FIG. 2, the photonic elbow 11 can be constructed in the following manner: at the mid-section or turning point of the elbow, a 45 degree single plane (flat) mirror 12 is oriented so that the traveling expanding or contracting image is diverted from its straight line path to an adjacent path (up, down, left or right) where it will then continue in another straight line path until it is once again deflected into a different direction by another photonic elbow. In other words, the traveling image is simultaneously expanding (or contracting) and changing direction. The number and direction of each photonic elbow depends upon the needs of the user.

Both ends of the photonic elbow should be terminated with a clear material at its openings to allow the image to travel through as unobstructed as possible. The same type of coupling device, which uses treads to join two plumbing pipes together and thereby fits snugly over its joined ends, should be employed to join a photonic elbow to a straight line photonic wave guide section, so that its junction area will not only be physically joined together, but also will prevent light or other substances from entering or leaving the junction point. Of course, the internal environment of the photonic elbow must be the same as its photonic straight line portion so that the entire photonic wave guide structure from the transmitting site to the receiving site is as straight, light proof and air tight as possible.

Therefore, the entire construction of the photonic television system is quite similar to a plumber running a new piping system within a household. The piping system propels water to where the plumber has directed the water to go; whereby the photonic wave guide system propels images to where the technician has directed them to go to.

Plastic concave and convex lenses which can be molded to any desired shape to overcome spherical and chromatic aberrations should be used to give a sharper image as the image is propagated through the photonic wave guide. The physical focal length between each lens, is determined by the size of the lenses, whose size itself, is determined by the physical diameter of the internal space of the photonic wave guide, which in actuality could be of any and many dimensions. The diameter of the photonic wave guide, therefore, sets the mathematical parameters of this invention. The lenses are preferably arranged so that they are one focal length apart.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

I claim:

1. A photonic telecommunications transmission system comprising:

a photonic wave guide containing a plurality of lenses located along its axis for transmitting a three dimensional image, said lenses being alternatively concave and convex for continually expanding and contracting said image as said image is transmitted through said wave guide;

a photonic camera positioned at an end of said photonic wave guide for projecting said image through said wave guide; and a photonic projector positioned at an opposite end of said photonic wave guide for magnifying said image for perception by a viewer.

2. A photonic telecommunications transmission system of claim 1, wherein said lenses are each positioned one focal length apart.

3. A photonic telecommunications transmission system of claim 1, wherein said system is light and air proof.

4. A photonic telecommunications transmission system of claim 1, further comprising at least one photonic elbow for re-routing said image in a different direction.

5. A photonic telecommunications transmission system comprising:

a photonic wave guide containing a plurality of lenses located along its axis for transmitting a three dimensional image of incoherent light, said lenses being alternatively concave and convex for continually expanding and contracting said image as said image is transmitted through said wave guide;

a photonic camera positioned at an end of said photonic wave guide for projecting said image through said wave guide; and a photonic projector positioned at an opposite end of said photonic wave guide for magnifying said image for perception by a viewer.

6. A photonic telecommunications transmission system comprising:

a photonic wave guide containing a plurality of lenses located along its axis for transmitting an image, said lenses being alternatively concave and convex for continually expanding and contracting said image as said image is transmitted through said wave guide;

a photonic camera positioned at an end of said photonic wave guide for projecting said image through said wave guide; and a photonic projector positioned at an opposite end of said photonic wave guide for magnifying said image for perception by a viewer.

7. A method for transmitting a three dimensional image of incoherent light comprising:

projecting said image by means of a photonic camera;

transmitting said image through a photonic wave guide;

continually expanding and contracting said image transmitted through said wave guide; and magnifying said image for perception by a viewer by means of a photonic projector.

8. A method for transmitting a three dimensional image comprising:

projecting said image by means of a photonic camera;

transmitting said image by continually expanding and contracting said image through a photonic wave guide; and magnifying said image for perception by a viewer by means of a photonic projector.

9. A method for transmitting a three dimensional image of claim 8, wherein said image is incoherent light comprising a myriad of photons of different energy levels.

10. A method for transmitting an image comprising:

projecting said image by means of a photonic camera;

transmitting said image by continually expanding and contracting said image through a photonic wave guide; and magnifying said image for perception by a viewer by means of a photonic projector.

* * * * *